(12) United States Patent
Haltmeyer (10) Patent No.: US 7,774,838 B2
(45) Date of Patent: Aug. 10, 2010

(54) THOROUGH OPERATION RESTRICTION

(75) Inventor: John M. Haltmeyer, Clarksville, MD (US)

(73) Assignee: Tricerat, Inc., Columbia, MD (US)

( * ) Notice: Subject to any disclaimer, the term of this patent is extended or adjusted under 35 U.S.C. 154(b) by 1626 days.

(21) Appl. No.: 10/076,948

(22) Filed: Feb. 19, 2002

(65) Prior Publication Data

US 2002/0174359 A1   Nov. 21, 2002

Related U.S. Application Data

(60) Provisional application No. 60/268,522, filed on Feb. 14, 2001.

(51) Int. Cl.
*G06F 21/00* (2006.01)

(52) U.S. Cl. .......................... 726/17; 726/22

(58) Field of Classification Search ............. None
See application file for complete search history.

(56) References Cited

U.S. PATENT DOCUMENTS

| | | |
|---|---|---|
| 5,802,397 A | 9/1998 | Greenstein et al. |
| 6,463,583 B1 * | 10/2002 | Hammond .................. 717/162 |
| 6,718,414 B1 * | 4/2004 | Doggett ....................... 710/267 |
| 7,165,269 B2 * | 1/2007 | Winneg et al. ................. 726/16 |
| 2001/0025311 A1 * | 9/2001 | Arai et al. .................... 709/225 |

OTHER PUBLICATIONS

"SetWindowsHookEx", Microsoft 1997, dietmonday.com.*
"Teach Yourself Unix in a Week", (Chapter 16, pp. 420-449) Taylor, 1994, SAMs publishing.*

* cited by examiner

*Primary Examiner*—Gilberto Barron, Jr.
*Assistant Examiner*—Devin Almeida
(74) *Attorney, Agent, or Firm*—Lawrence E. Laubscher, Jr.

(57) ABSTRACT

A thorough method for restricting which operations (processes) can be run by a user on a single workstation computer or by a user on a session in a multi-user environment, such as Microsoft Windows 2000 Terminal Services. By default, all applications (processes) are disallowed. Only explicitly assigned applications (processes) are allowed to run. The method entails running two software modules in user mode, one of which maintains a list of allowed processes for each user and one of which monitors new processes as they are started. When a new process is started the monitoring module sends the process ID to the list module. The list module checks the ID against its list and kills the process if it is not authorized. This way, only processes created by users are validated as apposed to validating all file I/O (processor intensive). This decreases the processing requirements.

4 Claims, 4 Drawing Sheets

THOROUGH OPERATION RESTRICTION

CROSS-REFERENCE TO RELATED APPLICATIONS

The present application derives priority from U.S. provisional application No. 60/268,522, filed Feb. 14, 2001.

BACKGROUND OF THE INVENTION

1. Field of the Invention

The present invention relates to the restriction of programs that a user can run on a computer and, more particularly, to a thorough method for restricting unauthorized operations by a user on a single workstation computer or by a user on a session in a multi-user environment, such as Microsoft Windows 2000 Terminal Services.

2. Description of the Background

A prominent problem with computers and networks today is lax security. Viruses are rampant. Typically, a user is emailed a script program that is really a virus (like the "Love Bug" virus) and unknowingly runs the program associated with the script. Obviously, this can cause a wide range of problems. Also, when a computer system is "locked down", hackers will often target the computer system to do nothing more than "break in". Unfortunately, existing methods tend to trade-off the level of security with demand on system resources. There is no high performance, completely secure method available today to resolve this problem. To understand the problem, a brief overview of the Windows architecture is helpful.

Figure 1:
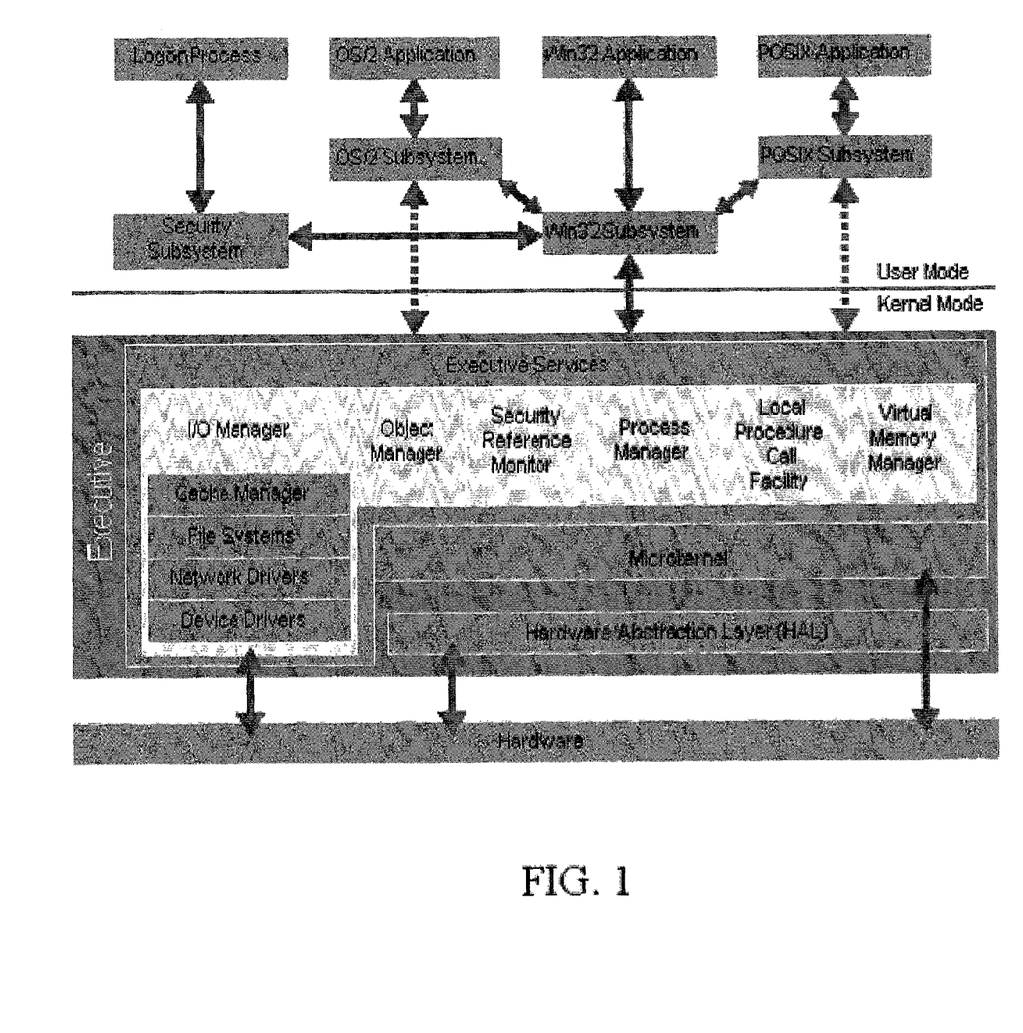
FIG. 1 is a system block diagram of the Microsoft Windows 2000 architecture.

FIG. 1 shows the Microsoft Windows 2000 architecture and illustrates the difference between user mode and kernal (or system) mode.

User mode is the least-privileged mode that Windows 2000 supports; it has no direct access to hardware and only restricted access to memory. For example, when software applications execute in user mode, they do so in a defined space with well-defined restrictions. They don't have direct access to hardware devices, and they can't touch parts of memory that are not specifically assigned to them.

On the other hand, system mode is a privileged mode. Those parts of Windows 2000 that execute in system mode, such as device drivers, have direct access to all hardware and memory. Other operating systems, including Windows NT, 3.1 and UNIX, also use analogous privileged and non-privileged modes. The services invoked in system mode are known as native advanced programming interface ("API"). The API is made up of about 250 functions that the operating system can access through software-exception system calls. A software-exception system call is a hardware-assisted way to change execution modes from user mode to system mode; it gives control over the data that passes between the two modes. Native API requests are executed by functions in system mode, known as system services.

As seen in FIG. 1, the Executive components include the I/O Manager, Object Manager, Security Reference Monitor, Process Manager, Local Procedure Call Facility, and Virtual Memory Manager. Each Executive component has a specific operating system responsibility. Device drivers are dynamically added components that work closely with the I/O Manager to connect to specific hardware devices, such as disks and input devices. The Executive components use basic hardware functionality implemented in the System. Client-side DLLs carry out tasks on behalf of their servers, but they execute as part of a client process. Given the foregoing overview, security will now be addressed.

In the Windows 2000 environment, there are two well known ways of controlling what programs (processes) specified users are allowed to run, and both have inherent flaws. One common way of marshaling processes is to use a technology known as a "filter driver". A filter driver is built to work in conjunction with the I/O Manager, intercepting all I/O within the disk system. The filter driver marshals those processes that are allowed to pass through and halts any processes that are unauthorized. Filter drivers run in system mode and they slow down the computer system significantly by monitoring all I/O with the particular subsystem. Moreover, filter drivers are processor intensive and are prone to single point of failure as well as problems with data loss.

Another means for marshaling applications (processes) is to "disallow" unauthorized programs. For example, U.S. Pat. No. 5,802,397 (IBM) shows a system for protection from unintended I/O access. An I/O protection array or list is used containing one-bit I/O keys. Each one-bit I/O key is used to disallow I/O accesses into an associated storage block. This method is not very practical. Only specified accesses or applications can be restricted. A "hacker" can write their own program to break a system, and it would not exist in the disallowed list of programs (processes), thus being allowed to be run by the hacker.

It would be greatly advantageous to overcome the problems associated with the two above-described methods with a user mode thorough operation restriction approach (ThOR), whereby a user can only run what an administrator has explicitly allowed the user to run, and all other processes will be terminated. By running in user mode, only the processes created by users would need to be validated as opposed to processor-intensive validation of all file I/O. This would decrease the processing requirements for marshaling user processes. Data loss due to program failure would be eliminated as system I/O is not interfered with, and any catastrophic failures would be constrained to a single user. This is an important feature when running a multi-user operating system like Windows 2000 Terminal Services.

SUMMARY OF THE INVENTION

In accordance with the above, it is an object of the present invention to provide a method for thoroughly restricting the applications (processes) that a user may run on a computer system.

The present invention is a Thorough Operation Restriction (ThOR) approach runs in user mode and not in system mode like filter drivers.

Generally, the method entails running two software modules in user mode, one of which maintains a list of allowed processes for each user and one of which monitors new processes as they are started. When a new process is started the monitoring module sends the process ID to the list module. The list module checks the ID against its list and kills the process if it is not authorized. This way, only processes created by users are validated as apposed to validating all file I/O (processor intensive). This decreases the processing requirements.

The software for Thorough Operation Restriction (ThOR) consists of two main compiled executables, or modules:

thor32.dll: This program is automatically attached to all new processes created. Thor32.dll can be attached by the Windows 2000 program USER32, or alternatively, by the creation of something called a WndProc (the name for the message queue used to create a window).

mjolnir.exe: This is a security management executable that builds the allowed applications list, and terminates the unauthorized applications (processes).

ThOR can be implemented on any computer including multi-user systems (such as Windows 2000 Terminal Services) and generally comprises the following steps:

1st: The module thor32.dll is attached to all new processes by tying into the USER32 and by creating a WndProc hook. A hook is a function that monitors the 'goings on' inside the Windows operating system. The WndProc hook is called every time a certain event in windows occurs.[1]

[1] See, Cummings, "An introduction to hook procedures", http://delphi.about.com/library/bluc/text/uc063001a.htm 2d: mjolnir.exe builds a list of allowed processes (allowed applications).

3d: When a new application is started, thor32.dll checks the process ID (this can be done by calling the API GetWindowThreadProcessId( ) function), and thor32.dll sends a message to mjolnir with the process ID of the process being examined.

4th: mjolnir.exe retrieves the name of the process as well as the path from the process ID received from thor32.dll. The name of the process is then checked against the list of allowed processes.

5th: If the process is allowed, mjolnir.exe answers the message back to thor32.dll, and thor32.dll marks the process as valid (no new messages are sent to mjolnir.exe from thor32.dll).

6th: If the process is not authorized, mjolnir.exe kills the process.

7th: the above is repeated recursively, mjolnir continuing to receive messages from thor32.dll each time a new process is created.

8th: mjolnir.exe closes when it receives the WM_QUERYENDSESSION message, meaning the user is logging off.

By running in user mode, only the processes created by users are validated as apposed to validating all file I/O (processor intensive). This decreases the processing requirements for marshaling user processes. Operating system processes run in the security context of "SYSTEM" and are left alone. These processes, by definition, belong to the operating system and do not need to be monitored. Data loss due to program failure is also eliminated with ThOR, as system I/O is not interfered with. Since it runs in the user's context, ThOR eliminates the single point of failure common with filter driver technology. If ThOR has a failure, it is only for the single user. This is an important feature when running a multi-user operating system like Windows 2000 Terminal Services. ThOR builds a list of "authorized" applications (processes), and does not rely on the administrator to "disallow" a particular application (process). The user can only run what the administrator has explicitly allowed the user to run. All other processes will be killed.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

Appendix A is exemplary source code for thor32.dll.
Appendix B is exemplary source code for mjolnir.exe.

DETAILED DESCRIPTION OF THE PREFERRED EMBODIMENT

The present invention is a software method for thoroughly restricting the applications (processes) that a user may run on a computer system. The method is implemented by software executables that run in user mode and not in system mode like filter drivers. The method of Thorough Operation Restriction (ThOR) consists of two main compiled executables, or modules:

1. thor32.dll: This executable program automatically attaches to all new processes created. Either by being attached by the Windows 2000 program USER32, or by the creation of something called a WndProc (the name for the message queue used to create a window). Appendix A is exemplary source code for thor32.dll.

2. mjolnir.exe: This executable program builds the allowed applications list, and kills the unauthorized applications (processes). Appendix B is exemplary source code for mjolnir.exe.

Figure 2:
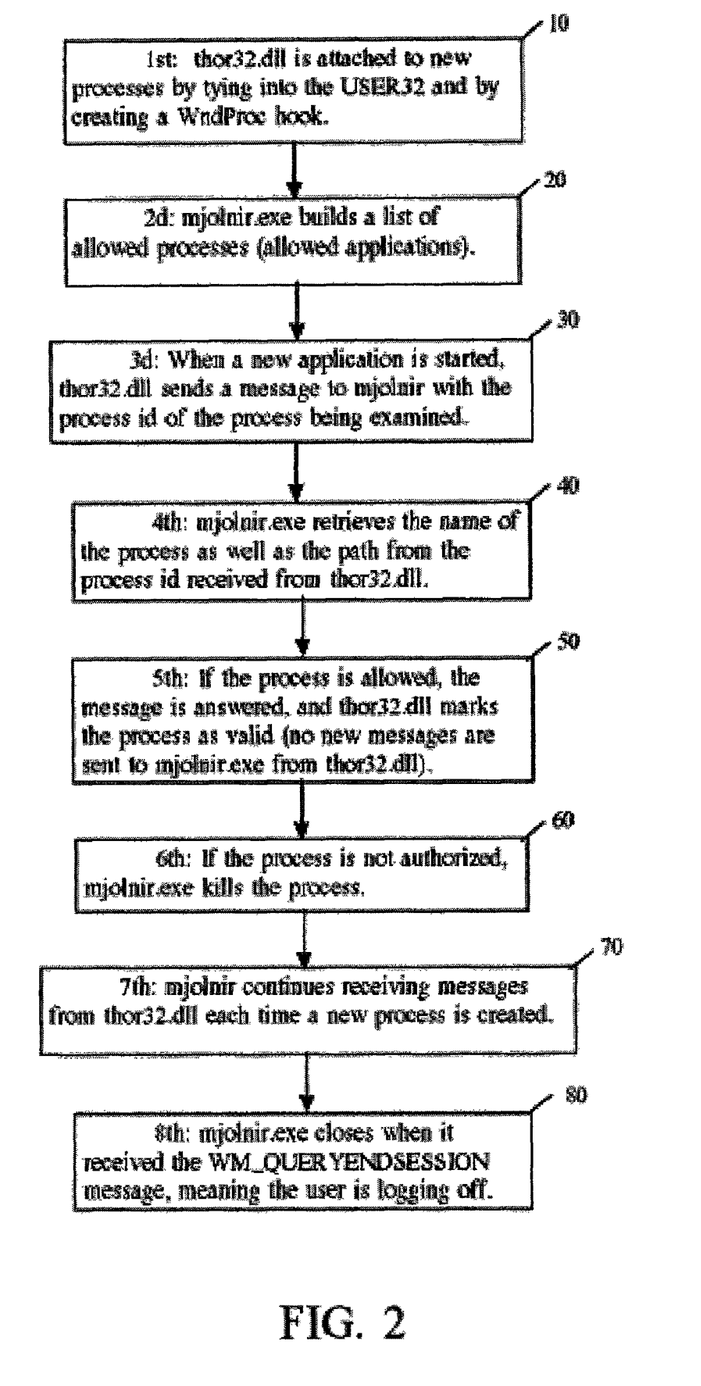
FIG. 2 is a perspective block diagram of the general ThOR method of the present invention.

The combination can be implemented on any computer including multi-user systems (such as Windows 2000 Terminal Services) and generally comprises the following steps as shown in FIG. 2:

1st: at step 10, thor32.dll is attached to new processes by tying into the USER32 and by creating a WndProc hook (See Appendix A, page 2, line 10)

2d: at step 20, mjolnir.exe builds a list of allowed processes (allowed applications). (See Appendix B, page 6, lines 15 et seq.)

3d: at step 30, when a new application is started, thor32.dll sends a message to mjolnir with the process id of the process being examined. (See Appendix A, page 1, lines 40 et seq.)

4th: at step 40, mjolnir.exe retrieves the name of the process as well as the path from the process id received from thor32.dll. (See Appendix B, page 9, line 35).

5th: at step 50, if the process is allowed, the message is answered and thor32.dll marks the process as valid (no new messages are sent to mjolnir.exe from thor32.dll). (See Appendix A, page 2, lines 29-31).

6th: at step 60, if the process is not authorized, mjolnir.exe kills the process. (See Appendix B, page 12, line 9).

7th: at step 70, mjolnir continues receiving messages from thor32.dll each time a new process is created.

8th: at step 80, mjolnir.exe closes when the user is logs off.

Figure 3:
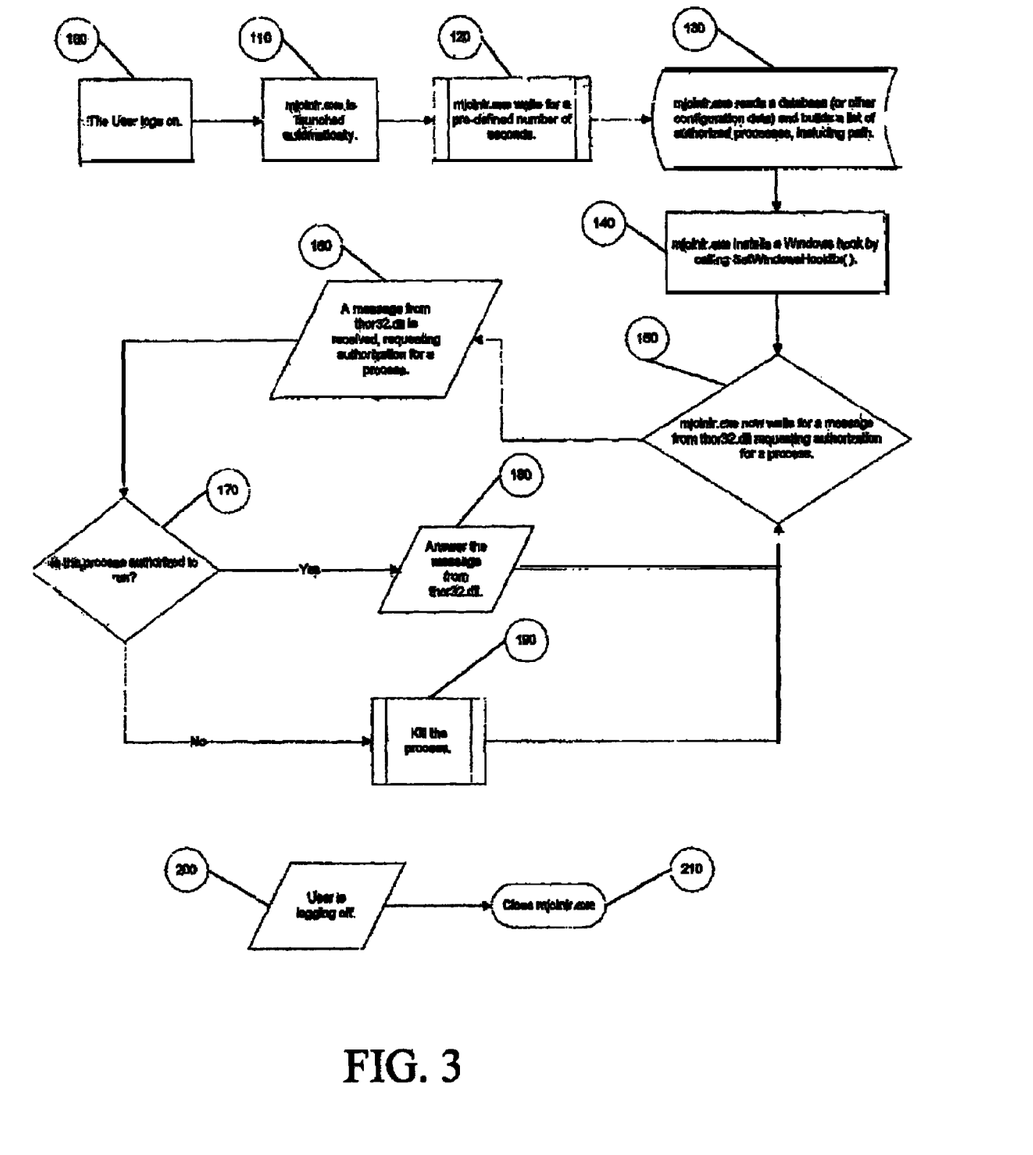
FIG. 3 is a flow chart of the Mjolnir.exe module.

FIG. 3 is a more detailed flow diagram of mjolnir.exe, the executable program that builds the allowed applications list, and kills unauthorized applications (processes).

At step 100 a user logs on to the computer.

At step 110 the executable mjolnir.exe is automatically started by the Windows userinit process.

At step 120, after startup, mjolnir.exe waits for a predefined time to allow logon scripts to complete running.

At step 130, after the delay has expired, mjolnir.exe builds an "allowed applications" list in memory. This list includes the full path to the executable as well as the number of times a user is allowed to run it. The list data can reside in a database and can be based on group membership, or it can be read from a configuration file.

At step 140 mjolnir.exe now installs something called a hook to attach thor32.dll to all new processes that create a graphical interface. A hook is a mechanism by which a function can intercept events (messages, mouse actions, keystrokes) before they reach an application. In order for Windows 2000 to call a function like thor32.dll, the latter must be attached to a Windows hook. Attaching the function to a hook is known as setting the hook. When a hook has a function attached and an event occurs that triggers the hook, Windows calls the function. This action is known as calling the hook. To maintain and access the thor32.dll function, the present method uses the SetWindowsHookEx and the UnhookWindowsHookEx functions. The SetWindowsHookEx function adds the function to the hook so that the function can act on events and, in some cases, modify or discard them. In the present case, Thor32.dll is a filter function that receives events. In accordance with the present invention, the SetWindowsHookEx is used to attach thor32.dll to all new processes that create a graphical interface.

After setting the hook, at step 150 mjolnir.exe now waits for a message from the thor32.dll program that is attached to all new processes.

Figure 4:
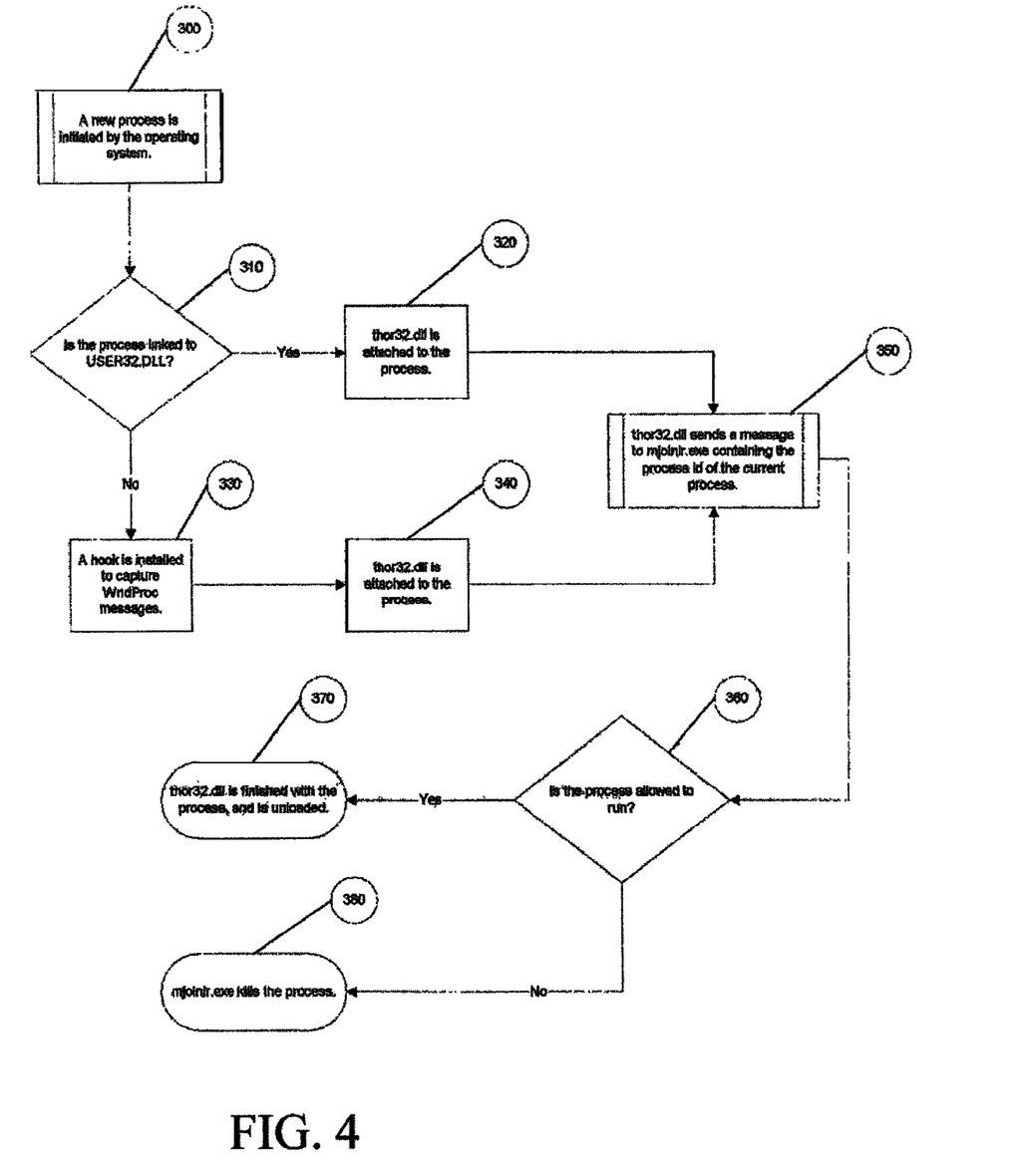
FIG. 4 is a flow chart of the Thor32.dll module.

FIG. 4 is a more detailed flow diagram of thor32.dll.

At step 300 a new process is created and, as previously explained, thor32.dll is automatically attached to the process. At step 310 the program checks to see if the process is linked to User32.dll. If so, thor32.dll is attached to the process at step 310 using USER32.DLL.

If not, thor32.dll is attached to the process at step 340 via step 330, wherein a hook is loaded. The hook is loaded by exporting a function (_LoadThorA) from thor32.dll, and the LoadThorA function in turn calls the SetWindowsHookEx function. The SetWindowsHookEx function takes three arguments:

1. An integer code describing the hook to which to attach thor32.dll
2. The address of thor32.dll.
3. The InstanceHandle for which the hook is to be installed. The InstanceHandle is used, not the thread ID, because the hook is called from the exported function (_LoadThorA) in thor32.dll, instead of the mjolnir.exe (where the threadID would otherwise be needed). This simplifies the process of loading the hook, since thor32.dll already knows what thread it is running in. The installed filter function will be called only in the context of the specified thread. The specific call to the SetWindowsHookEx function appears as follows: SetWindowsHookEx(WH_CALLWNDPROC, (HOOKPROC)GetMsgProc, InstanceHandle, 0).

Referring now to step 350, after thor32.dll is attached to the new process, it sends a message to mjolnir.exe by calling the SendMessage( ) function. One of the parameters of the message being sent is the process id (the unique identifier of the process) of the current process.

Referring back to FIG. 3, we left at step 150 with mjolnir.exe waiting for the above-described message.

At step 160, the message is received from thor32.dll.

At step 170, every time a message is received from thor32.dll to validate a process id, mjolnir.exe checks it's list of authorized applications and verifies that the process is allowed to run.

If the process is allowed to run, at step 180 the message is answered (also see step 370 of FIG. 4).

If the process is not authorized, at step 190 the process is killed (also see step 380 of FIG. 4).

Mjolnir continues this loop until it receives the WM_QUERYENDSESSION message meaning a logoff has occurred (step 200). Once the logoff message has been received, mjolnir.exe closes (step 210).

In the foregoing manner, the present ThOR method builds a list of "authorized" applications (processes), and does not rely on the administrator to "disallow" a particular application (process). The user can only run what the administrator has explicitly allowed the user to run. All other processes will be killed. Moreover, since both thor32.dll and mjolnir.exe run in user mode, only the processes created by users are validated as apposed to validating all file I/O (processor intensive). This decreases the processing requirements for marshaling user processes. Operating system processes run in the security context of "SYSTEM" and are left alone. These processes, by definition, belong to the operating system and do not need to be monitored. Data loss due to program failure is also eliminated with ThOR, as system I/O is not interfered with. Since it runs in the user's context, ThOR eliminates the single point of failure common with filter driver technology. If ThOR has a failure, it is only for the single user. This is an important feature when running a multi-user operating system like Windows 2000 Terminal Services.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

APPENDIX A exemplary source code for thor32.dll.

```
//---------------------------------------------------------------------------
#include <windows.h>
#include <TriceratMessaging.h>
HINSTANCE InstanceHandle;
bool Processed = false;
extern "C" __declspec(dllexport) void LoadThorA( );
extern "C" __declspec(dllexport) void UnloadThorA( );
// Shared Data
#pragma data_seg(".shared")      // Make a new section that we'll make shared
HHOOK hHook = 0;            // HHOOK from SetWindowsHook
#pragma data_seg( )
LRESULT CALLBACK GetMsgProc(int code, WPARAM wParam, LPARAM lParam);
#pragma argsused
int WINAPI DllEntryPoint(HINSTANCE hinst, unsigned long reason, void* lpReserved)
{
    HWND hWndMjolnir = NULL;
    InstanceHandle = hinst;
    DisableThreadLibraryCalls(hinst);
```

APPENDIX A-continued exemplary source code for thor32.dll.

```
        if (!Processed)
        {
          Processed = true;
          hWndMjolnir = FindWindow("TMjolnirMainForm", NULL);
          if (NULL != hWndMjolnir)
          {
            SendMessage(hWndMjolnir, TM_D2K_CHECKALLOWEDAPP, 0,
                GetCurrentProcessId( ));
          }   }
          return true;
}
//----------------------------------------------------------------
void LoadThorA( )
{
    hHook = SetWindowsHookEx(WH_CALLWNDPROC, (HOOKPROC)GetMsgProc, InstanceHandle, 0 );
}
//----------------------------------------------------------------
void UnloadThorA( )
{
    UnhookWindowsHookEx(hHook);
    hHook = NULL;
}
//----------------------------------------------------------------
LRESULT CALLBACK GetMsgProc(int code, WPARAM wParam, LPARAM lParam)
{
    LRESULT retValue = 0;
    HWND hWndMjolnir = NULL;
    if (!Processed)
    {
      Processed = true;
      hWndMjolnir = FindWindow("TMjolnirMainForm", NULL);
      if (NULL != hWndMjolnir)
      {
        SendMessage(hWndMjolnir, TM_D2K_CHECKALLOWEDAPP, 0,
            GetCurrentProcessId( ));
      }   }
    retValue = CallNextHookEx(hHook, code, wParam, lParam);
    return retValue;
}//----------------------------------------------------------------
```

APPENDIX B exemplary source code for mjolnir.exe.

```
//----------------------------------------------------------------
#include <vcl.h>
#pragma hdrstop
#include "MjolnirMainUnit.h"
#include "UnallowedAppUnit.h"
//----------------------------------------------------------------
#pragma package(smart_init)
#pragma link "NetworkInfo"
#pragma link "StBase"
#pragma link "StShBase"
#pragma link "StTrIcon"
#pragma link "NetworkInfo"
#pragma resource "*.dfm"
#pragma link "psapi.lib"
typedef __stdcall bool (*LOADDLL)( );
typedef __stdcall bool (*UNLOADDLL)( );
static bool KillUserProcess(DWORD ProcessId);
TMjolnirMainForm *MjolnirMainForm;
//----------------------------------------------------------------
__fastcall TMjolnirMainForm::TMjolnirMainForm(TComponent* Owner)
    : TForm(Owner)
{
    PmpStarting = false;
    DesktopStarting = false;
    SwingMjolnir = false;
}
//----------------------------------------------------------------
void __fastcall TMjolnirMainForm::HookThor32( )
{
    if (NULL == hThor32Lib)
```

APPENDIX B-continued exemplary source code for mjolnir.exe.

```
    {
        ShowMessage("Unable to load Thor32.Dll");
        Close( );
    }
    LOADDLL pfnLoadDll = (LOADDLL)GetProcAddress(hThor32Lib,
        "_LoadThorA");
    (*pfnLoadDll)( );
}
void__fastcall TMjolnirMainForm::UnhookThor32( )
{
    if (NULL == hThor32Lib)
    {
        ShowMessage("Unable to load Thor32.Dll");
        Close( );
    }
    UNLOADDLL pfnUnloadDll = (UNLOADDLL)GetProcAddress(hThor32Lib,
        "_UnloadThorA");
    (*pfnUnloadDll)( );
}
void__fastcall TMjolnirMainForm::FormCreate(TObject *Sender)
{
    TRegistry *Reg = new TRegistry( );
    bool ThorIsDisabled = false;
    ShowWindow(Application->Handle, SW_HIDE);
    Session->Active = false;
    ProductID = TI_PRODUCT_DESK2K1;
    Application->CreateForm(__classid(TLicenseForm), &LicenseForm);
    if (!LicenseForm->ValidateLicense( ))
    {
        MessageBox(NULL, "desktop 2001 License has expired!", "triCerat License",
            MB_OK | MB_ICONERROR | MB_SYSTEMMODAL);
        Application->Terminate( );
        return;
    }
    delete LicenseForm;
    Reg->RootKey = HKEY_LOCAL_MACHINE;
    Reg->OpenKey("Software\\Tricerat\\Controls", true);
    try
    {
        ThorIsDisabled = Reg->ReadBool("DisableThor");
        if (ThorIsDisabled)
        {
            Reg->CloseKey( );
            delete Reg;
            Application->Terminate( );
            return;
        }
    }
    catch(...)
    {
    }
    Reg->CloseKey( );
    Reg->OpenKey("Software\\Tricerat\\Desktop 2001", true);
    try
    {
        LoadTimer->Interval = Reg->ReadInteger("MjolnirStartupDelay") * 1000;
        if (0 >= LoadTimer->Interval)
        {
            LoadTimer->Interval = 10000;
        }
    }
    catch(...)
    {
        Reg->WriteInteger("MjolnirStartupDelay", 10);
        LoadTimer->Interval = 10000;
    }
    Reg->CloseKey( );
    delete Reg;
    TSecurity *sec = new TSecurity( );
    IsAdmin = sec->IsUserAdmin(getenv("COMPUTERNAME"), getenv("USERDOMAIN"),
getenv("USERNAME"));
    delete sec;
    hThor32Lib = LoadLibrary("Thor32.Dll");
    wts = new TWtsTools( );
    HookThor32( );
}
//------------------------------------------------------------------------
```

APPENDIX B-continued exemplary source code for mjolnir.exe.

```cpp
void __fastcall TMjolnirMainForm::FormActivate(TObject *Sender)
{
    ShowWindow(Application->Handle, SW_HIDE);
}
//----------------------------------------------------------------------
void __fastcall TMjolnirMainForm::FormClose(TObject *Sender, TCloseAction &Action)
{
    UnhookThor32( );
    if (NULL != hThor32Lib)
    {
        FreeLibrary(hThor32Lib);
    }
    delete wts;
}
//----------------------------------------------------------------------
void __fastcall TMjolnirMainForm::FormHide(TObject *Sender)
{
    ShowWindow(Application->Handle, SW_HIDE);
    Top = 5000;
    Left = 5000;
}
//----------------------------------------------------------------------
void __fastcall TMjolnirMainForm::HideTimerTimer(TObject *Sender)
{
    Hide( );
}
//----------------------------------------------------------------------
void __fastcall TMjolnirMainForm::HookBitBtnClick(TObject *Sender)
{
    HookThor32( );
}
//----------------------------------------------------------------------
void __fastcall TMjolnirMainForm::UnhookBitBtnClick(TObject *Sender)
{
    UnhookThor32( );
}
//----------------------------------------------------------------------
void __fastcall TMjolnirMainForm::AddOwners(TStrings* sql)
{
    sql->Add(" IN (SELECT ID FROM Owners WHERE Name = '" +
        FNetworkInfo->UserName + "'");
    if (FNetworkInfo->LocalComputerName != ("\\\\" + FNetworkInfo->DomainName))
        {
            FNetworkInfo->SourceServerName = FNetworkInfo->DomainControllerName;
            for (int i = 0; i < FNetworkInfo->MyGlobalGroupCount; i++)
                sql->Add(" OR Name = '" + FNetworkInfo->MyGlobalGroupNames[i] + "'");
        }
    FNetworkInfo->SourceServerName = " ";
    for (int i = 0; i < FNetworkInfo->MyLocalGroupCount; i++)
        sql->Add(" OR Name = '" + FNetworkInfo->MyLocalGroupNames[i] + "'");
    if (!FNetworkInfo->ClientName.IsEmpty( ))
        sql->Add(" OR Name = '" + FNetworkInfo->ClientName + "'");
    if (!FNetworkInfo->LocalComputerName.IsEmpty( ))
        sql->Add(" OR Name = '" + FNetworkInfo->LocalComputerName + "'");
    sql->Add(")");
}
//----------------------------------------------------------------------
void __fastcall TMjolnirMainForm::StringGridInitialize( )
{
    AllowedAppsStringGrid->RowCount = 1;
    AllowedAppsStringGrid->FixedRows = 0;
    AllowedAppsStringGrid->ColCount = 3;
    AllowedAppsStringGrid->ColWidths[0] = 100;
    AllowedAppsStringGrid->ColWidths[1] = 400;
    AllowedAppsStringGrid->ColWidths[2] = 50;
    AllowedAppsStringGrid->Refresh( );
    FirstRowOfStringGrid = true;
}
void __fastcall TMjolnirMainForm::LoadAllowedExecutables( )
{
    Session->Active = true;
    TQuery* query = new TQuery(NULL);
    AnsiString ParentProcess;
    AnsiString ProcessName;
    char szFileShortPath[MAX_PATH] = "unknown";
    int InstanceLimit = 0;
    int j = 0;
```

APPENDIX B-continued exemplary source code for mjolnir.exe.

```
StringGridInitialize( );
query->UniDirectional = true;
query->Constrained = true;
query->RequestLive = false;
query->DatabaseName = "Tricerat D2K1";
query->SQL->Add("SELECT DISTINCT e.Executable, e.InstanceLimit, e.Dependencies ");
query->SQL->Add("FROM Executables e, StartMenuItems s, Owners o ");
query->SQL->Add("WHERE ");
query->SQL->Add("e.ID = sExecutableID AND s.OwnerID = o.ID ");
query->SQL->Add("AND e.Disabled = False ");
query->SQL->Add("AND s.OwnerID ");
AddOwners(query->SQL);
try
{
  query->Open( );
  for (int i = 0; i < query->RecordCount; i++)
  {
    try
    {
      InstanceLimit = query->FieldByName("InstanceLimit")->AsInteger;
    }
    catch(...)
    {
      InstanceLimit = 1;
    }
    ProcessName = query->FieldByName("Executable")->AsString;
    if (0 != ExtractFileExt(ProcessName).AnsiCompareIC(".EXE"))
    {
      ProcessName = GetFileAssociation(ProcessName);
    }
    ParentProcess =
      ExtractFileName(ProcessName);
    AddAllowedApp(ParentProcess, ProcessName, InstanceLimit);
    AddDependencies(query->FieldByName("Dependencies")->AsString,
      ParentProcess, 9999);
    query->Next( );
  }
}
catch(...)
{
}
query->Close( );
query->SQL->Clear( );
query->SQL->Add("SELECT DISTINCT e.Executable, e.InstanceLimit, e.Dependencies ");
query->SQL->Add("FROM Executables e, DesktopItems d, Owners o ");
query->SQL->Add("WHERE ");
query->SQL->Add("e.ID = d.ExecutableID AND d.OwnerID = o.ID ");
query->SQL->Add("AND e.Disabled = False ");
query->SQL->Add("AND d.OwnerID ");
AddOwners(query->SQL);
try
{
  query->Open( );
  for (int i = 0; i < query->RecordCount; i++)
  {
    try
    {
      InstanceLimit = query->FieldByName("InstanceLimit")->AsInteger;
    }
    catch(...)
    {
      InstanceLimit = 1;
    }
    ProcessName = query->FieldByName("Executable")->AsString;
    if (0 != ExtractFileExt(ProcessName).AnsiCompareIC(".EXE"))
    {
      ProcessName = GetFileAssociation(ProcessName);
    }
    ParentProcess =
      ExtractFileName(ProcessName);
    AddAllowedApp(ParentProcess, ProcessName, InstanceLimit);
    AddDependencies(query->FieldByName("Dependencies")->AsString,
      ParentProcess, 9999);
    query->Next( );
  }
}
catch(...)
```

APPENDIX B-continued exemplary source code for mjolnir.exe.

```
        {
        }
        query->Close( );
        delete query;
        SwingMjolnir = true;
        Session->Active = false;
}
//------------------------------------------------------------------------
bool __fastcall TMjolnirMainForm::AddAllowedApp(AnsiString ParentProcess, AnsiString AppPath, int Instances)
{
        //The TStringGrid has one row initially, so don't add a new one.
        if (FirstRowOfStringGrid)
        {
            FirstRowOfStringGrid = false;
        }
        else
        {
            AllowedAppsStringGrid->RowCount++;
        }
        AllowedAppsStringGrid->Cells[0][AllowedAppsStringGrid->RowCount – 1] =
            ParentProcess;
        AllowedAppsStringGrid->Cells[1][AllowedAppsStringGrid->RowCount – 1] =
            ResolveFileShortPath(AppPath);
        AllowedAppsStringGrid->Cells[2][AllowedAppsStringGrid->RowCount – 1] =
            String(Instances);
        return true;
}
void __fastcall TMjolnirMainForm::OnCheckAllowedApp(TMessage &Message)
{
        ValidateProcess(Message.LParam);
}
//------------------------------------------------------------------------
bool __fastcall TMjolnirMainForm::ValidateProcess(DWORD ProcessId)
{
        AnsiString ProcessPath;
        TStringList *RunningApps;
        bool InstanceCountExceeded = false;
        bool ParentProcessRunning = false;
        bool ValidProcess = false;
        int i = 0;
        if (!SwingMjolnir)
        {
            return true;
        }
        ProcessPath = GetProcessShortPath(ProcessId);
        if (ProcessPath.IsEmpty( ))
        {
            return true;
        }
        //Get the list of running apps.
        RunningApps = wts->GetSessionProcessList( );
        //Go through the Allowed Apps Grid and see if the Process is allowed to run.
        i = -1;
        while (AllowedAppsStringGrid->RowCount > ++i)
        {
            if (0 == ProcessPath.AnsiCompareIC(
                AllowedAppsStringGrid->Cells[1][i]))
            {
                int AppCount = 0;
                int j = 0;
                //Check the instance count
                j = -1;
                while(RunningApps->Count > ++j)
                {
                    if (0 == RunningApps->Strings[j].AnsiCompareIC(
                        ExtractFileName(AllowedAppsStringGrid->Cells[1][i])))
                    {
                        AppCount++;
                    }
                }
                if (AppCount > AllowedAppsStringGrid->Cells[2][i].ToIntDef(0))
                {
                    InstanceCountExceeded = true;
                }
                //Try to find the Parent process.
                j = -1;
                while(RunningApps->Count > ++j)
```

APPENDIX B-continued exemplary source code for mjolnir.exe.

```
      {
        if (0 == RunningApps->Strings[j].AnsiCompareIC(
            AllowedAppsStringGrid->Cells[0][i]))
        {
          ParentProcessRunning = true;
        }
      }
    }
    if (!InstanceCountExceeded && ParentProcessRunning)
    {
      ValidProcess = true;
      break;
    }
  }
  RunningApps->Clear( );
  delete RunningApps;
  //Validate the Instance Count.
  if (InstanceCountExceeded)
  {
    if (IsAdmin)
    {
      MessageBox(NULL, "The program Instance Count has been exceeded.\
          \n\nPlease adjust the program \"Instance Count Limit\".",
          "Instance COunt Exceeded", MB_OK | MB_SYSTEMMODAL | MB_ICONINFORMATION);
    }
    else
    {
      if (KillUserProcess(ProcessId))
      {
        TInstanceLimitForm *Notify = new TInstanceLimitForm(NULL);
        Notify->ProcessPathLabel->Caption = ProcessPath;
        Notify->ShowModal( );
        delete Notify;
      }
    }
    return false;
  }
  //Validate the process.
  if (!ValidProcess)
  {
    if (IsAdmin)
    {
      TAdminForm *admin = new TAdminForm(NULL);
      admin->ProcessEdit->Text = ProcessPath;
      admin->ShowModal( );
      delete admin;
    }
    else
    {
      if (KillUserProcess(ProcessId))
      {
        TUnallowedAppForm *Notify = new TUnallowedAppForm(NULL);
        Notify->ProcessPathLabel->Caption = ProcessPath;
        Notify->ShowModal( );
        delete Notify;
      }
    }
    return false;
  }
  return true;
}
//---------------------------------------------------------------------
AnsiString __fastcall TMjolnirMainForm::ResolveFileShortPath(AnsiString File)
{
  AnsiString Path;
  AnsiString FileShortPath;
  char szFileShortPath[MAX_PATH] = "unknown";
  TDirTools *Dir = new TDirTools( );
  File = Dir->ParseEnvironment(File);
  delete Dir;
  Path = getenv("PATH");
  Path = ".\\;" + Path;
  if (ExtractFilePath(File).IsEmpty( ))
  {
    //For some reason, FileSearch( ) does not search the CurrentDir.
    if (FileExists(GetCurrentDir( ) + "\\" + File))
    {
```

APPENDIX B-continued exemplary source code for mjolnir.exe.

```
            File = GetCurrentDir( ) + "\\" + File;
        }
        else
        {
            File = FileSearch(File, Path);
        }
    }
    GetShortPathName(File.c_str( ), szFileShortPath,
        sizeof(szFileShortPath));
    FileShortPath = szFileShortPath;
    if (FileShortPath.IsEmpty( ))
    {
        FileShortPath = File;
    }
    return FileShortPath;
}
//-----------------------------------------------------------------------
AnsiString__fastcall TMjolnirMainForm::GetProcessShortPath(DWORD ProcessId)
{
    HANDLE hProcess;
    HMODULE hMod;
    DWORD cbNeeded = 0;
    char szProcessPath[MAX_PATH] = "unknown";
    char szProcessShortPath[MAX_PATH] = "unknown";
    AnsiString ProcessShortPath;
    hProcess = OpenProcess(PROCESS_QUERY_INFORMATION | PROCESS_VM_READ, FALSE,
        ProcessId);
    if (EnumProcessModules(hProcess, &hMod, sizeof(hMod), &cbNeeded))
    {
        //To get just the name of the process, call this:
        //GetModuleBaseName(hProcess, hMod, szProcessName, sizeof(szProcessName));
        //Get the full path of the process.
        GetModuleFileNameEx(hProcess, hMod, szProcessPath, sizeof(szProcessPath));
        GetShortPathName(szProcessPath, szProcessShortPath,
            sizeof(szProcessShortPath));
        ProcessShortPath = szProcessShortPath;
    }
    CloseHandle(hProcess);
    return ProcessShortPath;
}
//-----------------------------------------------------------------------
bool KillUserProcess(DWORD ProcessId)
{
    HANDLE hProcess;
    hProcess = OpenProcess(PROCESS_ALL_ACCESS, TRUE, ProcessId);
    if (NULL == hProcess)
        return false;
    return TerminateProcess(hProcess, 0);
}
//-----------------------------------------------------------------------
void__fastcall TMjolnirMainForm::OnDesktopInit(TMessage & Message)
{
    if (0 == Message.WParam)
    {
        DesktopStarting = true;
        LoadTimer->Enabled = false;
    }
    if (1 == Message.WParam)
    {
        DesktopStarting = false;
        if (!PmpStarting)
        {
            InitializeMjolnir( );
        }
    }
}
void__fastcall TMjolnirMainForm::OnPmpInit(TMessage & Message)
{
    if (0 == Message.WParam)
    {
        PmpStarting = true;
        LoadTimer->Enabled = false;
    }
    if(1 == Message.WParam)
    {
        PmpStarting = false;
        if (!DesktopStarting)
```

APPENDIX B-continued exemplary source code for mjolnir.exe.

```
        {
            InitializeMjolnir( );
        }
    }
}
void __fastcall TMjolnirMainForm::InitializeMjolnir( )
{
    LoadAllowedExecutables( );
}
void __fastcall TMjolnirMainForm::OnRefresh(TMessage & Message)
{
    InitializeMjolnir( );
}
void __fastcall TMjolnirMainForm::LoadTimerTimer(TObject *Sender)
{
    LoadTimer->Enabled = false;
    InitializeMjolnir( );
}
//---------------------------------------------------------------------
void __fastcall TMjolnirMainForm::RefreshBitBtnClick(TObject *Sender)
{
    InitializeMjolnir( );
}
//---------------------------------------------------------------------
void __fastcall TMjolnirMainform::AddDependencies(AnsiString Delimited,
        AnsiString ParentProcess, int DefaultInstanceLimit)
{
    TStringList *ParsedStrings;
    int i = 0;
    if (Delimited.IsEmpty( ))
        return;
    ParsedStrings = GetParsedStringList(Delimited);
    i = -1;
    while (ParsedStrings->Count > ++i)
    {
        AddAliasDependencies(ParsedStrings->Strings[i],
            ParentProcess, DefaultInstanceLimit);
    }
}
TStringList * __fastcall TMjolnirMainForm::GetParsedStringList(AnsiString Delimited)
{
    TStringList *DelimitedCharList = new TStringList;
    TStringList *ParsedStrings = new TStringList( );
    TStringList *SubStrings;
    AnsiString FoundString;
    AnsiString RemainingString;
    bool SubStringsFound = false;
    int Index = 0;
    int i = 0;
    int j = 0;
    if (Delimited.IsEmpty( ))
        return ParsedStrings;
    DelimitedCharList->Add(";");
    DelimitedCharList->Add(",");
    i = -1;
    while (DelimitedCharList->Count > ++i)
    {
        Index = Delimited.AnsiPos(DelimitedCharList->Strings[i]);
        if (0 >= Index)
            continue;
        SubStringsFound = true;
        FoundString = Delimited.SubString(1, Index - 1);
        RemainingString = Delimited.SubString(Index + 1,
            Delimited.Length( ) - Index);
        SubStrings = GetParsedStringList(FoundString);
        j = -1;
        while (SubStrings->Count > ++j)
        {
            ParsedStrings->Add(SubStrings->Strings[j]);
        }
        delete SubStrings;
        SubStrings = GetParsedStringList(RemainingString);
        j = -1;
        while (SubStrings->Count > ++j)
        {
            ParsedStrings->Add(SubStrings->Strings[j]);
        }
```

APPENDIX B-continued exemplary source code for mjolnir.exe.

```
        delete SubStrings;
    }
    if (!SubStringsFound)
    {
        ParsedStrings->Add(Delimited);
    }
    DelimitedCharList->Clear( );
    delete DelimitedCharList;
    return ParsedStrings;
}
void __fastcall TMjolnirMainForm::AddAliasDependencies(AnsiString Alias,
    AnsiString ParentProcess, int DefaultInstanceLimit)
{
    if (FileExists(ResolveFileShortPath(Alias)))
    {
        AddAllowedApp(ParentProcess, Alias, DefaultInstanceLimit);
        return;
    }
    TQuery* query = new TQuery(NULL);
    query->UniDirectional = true;
    query->Constrained = true;
    query->RequestLive = false;
    query->DatabaseName = "Tricerat D2K1";
    query->SQL->Add("SELECT d.Path ");
    query->SQL->Add("FROM Dependencies d ");
    query->SQL->Add("WHERE ");
    query->SQL->Add("d.Name = '" + Alias + "'");
    try
    {
        query->Open( );
        for (int i = 0; i < query->RecordCount; i++)
        {
            AddAllowedApp(ParentProcess,
                ResolveFileShortPath(query->FieldByName("Path")->AsString),
                DefaultInstanceLimit);
            query->Next( );
        }
    }
    catch(...)
    {
    }
    query->Close( );
    delete query;
}
AnsiString __fastcall TMjolnirMainForm::GetFileAssociation(AnsiString File)
{
    AnsiString Association;
    AnsiString FilePath;
    AnsiString FileName;
    char szResult[1024];
    ZeroMemory(szResult, sizeof(szResult));
    Association = File;
    File = ResolveFileShortPath(File);
    if (FileExists(File))
    {
        FileName = ExtractFileName(File);
        FilePath = ExtractFilePath(File);
        if (!FileName.IsEmpty( ) && !FilePath.IsEmpty( ))
        {
            if (32 < (int)FindExecutable(FileName.c_str( ), FilePath.c_str( ), szResult))
            {
                if (FileExists(szResult))
                {
                    Association = szResult;    }    }    }    }    return Association;}
```

I claim:

1. A process for controlling the applications that a computer user may run on a multi-user system, comprising the steps of:

automatically using a security executable on the multi-user system in user mode to create a list of authorized applications in a database of the multi-user system for the computer user when the computer user logs on to the multi-user system;

attaching a hook function in user mode to all new applications;

employing the hook function whenever a new application is started to send a message to the security executable in user mode, said message including the ID and path of the new application;

receiving said message from the hook function at the security executable and correlating to said list to determine whether the new application is authorized;

answering the message by the security executable when the new application is authorized and;

stopping the new application when the new application is not authorized.

2. A system for controlling the applications that a computer user may run on a multi-user system, comprising:

a security executable in user mode for creating a list of authorized applications in a database of the multi-user system for the computer user;

a hook function which is automatically attached to all new applications in user mode when the computer user logs on to the multi-user system;

means for querying an ID of each said new application; and means for sending a message with the application ID and the path of the application being examined using said security executable;

means for retrieving the ID of each new application;

means for terminating each new application not identified on said list of allowed applications; and means for answering a message when the application is identified on said list of allowed applications.

3. The system for controlling the applications that a computer user may run according to claim 2, wherein said hook function is attached to said new applications by using a system dynamic link library.

4. A process for controlling the applications that computer users may run on a network, comprising the steps of:

using a security executable on the network in user mode to create and maintain a list of authorized applications in a database of the network and IDs for each computer user when the computer user logs on to the network;

attaching a hook function to all new applications;

monitoring all new applications that are started with the hook function and determining an application ID thereof;

receiving said application ID from the hook function by the security executable;

determining whether the application ID of each started application is on said list;

allowing said application to continue when its application ID is on the list; and terminating said application when its application ID is not on the list.

* * * * *